United States Patent [19]
Frichtel et al.

[11] Patent Number: 5,689,801
[45] Date of Patent: Nov. 18, 1997

[54] POWER MONITORING SYSTEM FOR A SINGLE SITE, SPLIT LOCATION TRUNKED RADIO COMMUNICATION SYSTEM

[75] Inventors: John S. Frichtel, Lynchburg; Robert O. Canada, III, Bedford; Kennard N. Gwin, Lynchburg, all of Va.

[73] Assignee: Ericsson Inc., Research Triangle Park, N.C.

[21] Appl. No.: 340,346

[22] Filed: Nov. 14, 1994

[51] Int. Cl.$^6$ ................................................ H04B 7/155
[52] U.S. Cl. .............................. 455/9; 455/8; 455/56.1
[58] Field of Search ........................... 455/67.1, 67.4, 455/54.1, 67.3, 53.1, 8, 9, 54.2, 14; 370/16, 13.1, 327, 318; 359/174, 167; 375/211, 213

[56] References Cited

U.S. PATENT DOCUMENTS

| | | | |
|---|---|---|---|
| 4,266,183 | 5/1981 | Steensma et al. | 370/13.1 |
| 4,441,180 | 4/1984 | Schüssler . | |
| 4,521,912 | 6/1985 | Franke et al. . | |
| 4,823,280 | 4/1989 | Mailandt et al. . | |
| 4,905,302 | 2/1990 | Childress et al. . | |
| 5,086,506 | 2/1992 | Hall et al. . | |
| 5,123,110 | 6/1992 | Grube | 455/54.1 |
| 5,175,866 | 12/1992 | Childress et al. . | |
| 5,305,467 | 4/1994 | Herndon et al. . | |
| 5,313,652 | 5/1994 | Rozenstrauch et al. | 455/56.1 |
| 5,418,785 | 5/1995 | Olshansky et al. . | |
| 5,422,885 | 6/1995 | Nadkarni . | |
| 5,446,924 | 8/1995 | Christian et al. . | |
| 5,471,649 | 11/1995 | Rees et al. | 455/54.1 |
| 5,491,835 | 2/1996 | Sasuta et al. | 455/54.1 |
| 5,517,232 | 5/1996 | Heidemann et al. . | |
| 5,535,426 | 7/1996 | Leigh et al. . | |

OTHER PUBLICATIONS

Motorola Technical Developments, vol. 13, Jul. 1991, Schaumburg, Illinois, US, pp. 77–78, XP 000259229, G. Grube, "Site Shared Wide Area Trunked Network".

Primary Examiner—Nguyen Vo
Attorney, Agent, or Firm—Nixon & Vanderhye

[57] ABSTRACT

Base stations located at physically separate, remote locations are operated as a single site to permit trunked radio communications between portable radios located at those split sites. A first trunked RF communication site located at a first split site location includes plural first base stations, each first base station including a transceiver corresponding to an RF communications channel. The first site also includes a first site controller, connected to each of the first base stations, for assigning base station transceivers to radios requesting an RF communications channel. A second trunked RF communications site is located at a second split site location remote from the first split site location and includes plural second base stations along with a second site controller. A communication link links the first and second split sites so that they function as a single site trunked radio communications system with one of the first and second site controllers assigning the first and second base station transceivers to radios requesting RF communications channels. Base station transmitter power is measured at the split site locations and reported to the site controller currently in charge of the split location, single site trunked radio communications system.

13 Claims, 11 Drawing Sheets

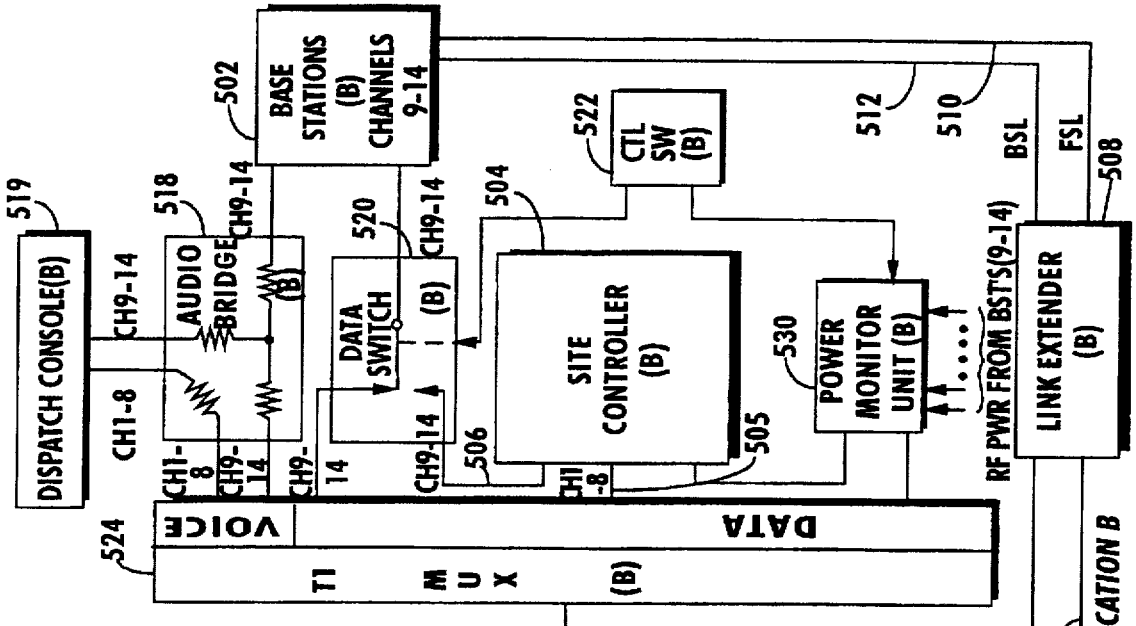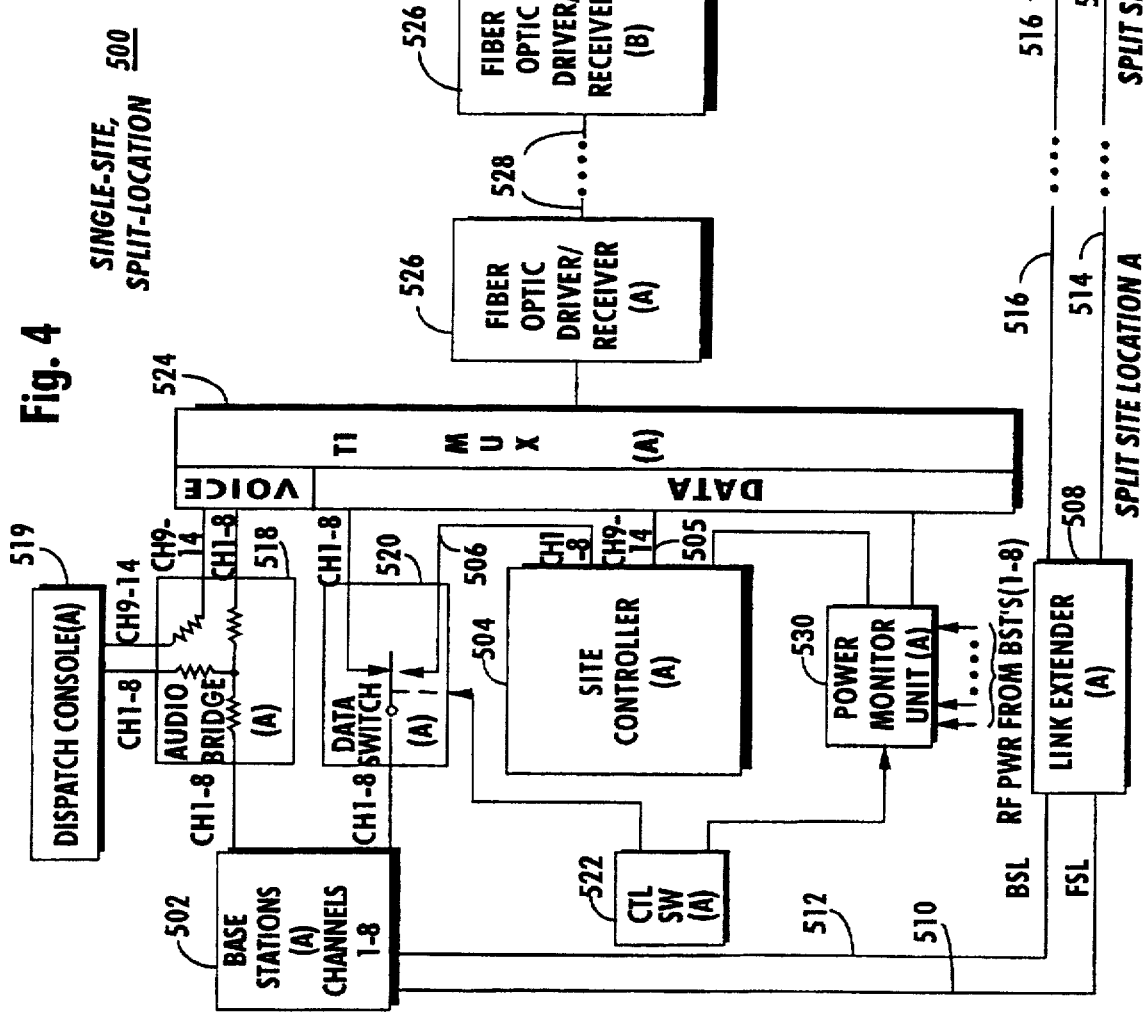

POWER MONITORING SYSTEM FOR A SINGLE SITE, SPLIT LOCATION TRUNKED RADIO COMMUNICATION SYSTEM

RELATED APPLICATIONS

This application is related to related application entitled "Single Site, Split Location Trunked Radio Communications System" filed on Nov. 14, 1994, U.S. patent application Ser. No. 08/340,345.

BACKGROUND AND SUMMARY OF THE INVENTION

This invention is directed to trunked radio repeater systems, and more particularly describes a trunked radio communication system where trunked RF base station repeaters located at remote site locations are operated as a single site.

An example of a trunked radio repeater system is generally depicted in FIG. 1. Individual radio units are assigned to various groups. For example, all police officers could be assigned to one or more groups. Radio units of various groups communicate with each other within and outside of their own group using shared radio repeaters which are part of a trunked repeater system 100. A dispatch console 102 may be housed directly at the repeater system site 104 or may be remotely located via other communication facilities 106. In addition to groups including one particular type of personnel such as police officers, larger groups may establish efficient radio communications between individual radio units within many different agencies. For example, the police department may have a need to provide efficient communications between different units of its squad car force, different portable traits assigned to foot patrolmen, different units of detectives or narcotics agents and the like. In accordance with trunking theory, a relatively small number of radio repeaters can efficiently service these types of needs within a given geographical area if they are shared on a "as needed" basis between all potential radio units, i.e. trunked.

The single site 100 is depicted in greater detail in FIG. 2. A common antenna 200 is utilized with conventional transmit combiner, receiver multicoupler, and duplexer circuitry 202 to transmit and receive RF communications using a plurality of duplex RF channel transmit/receive circuits included in a plurality of RF base station transceivers (BSTs) 204, 206 and 208. Each base station transceiver corresponds to a radio communications channel. Each base station transceiver is typically controlled by dedicated control shelf logic circuitry which is in turn controlled by microprocessor-based logic control circuits collectively referred to as trunking cards (TC) 210, 212, and 214.

All of the trunking cards 210, 212, and 214 communicate with a primary site controller 250 via control data buses 216(1), 216(2), and 216(3). Although the major intelligence and control capability for the trunking system resides within primary site controller 250, alternate backup and "failsoft" control functions are incorporated within the trunking cards 210-214 so as to provide continued trunked repeater service even in the event that the primary site controller 250 malfunctions or is otherwise taken out of service. The trunking card also receives hardwired inputs over from synchronization link (FSL) 226 and backup serial link (BSL) 228.

An optional telephone network interconnect may also be provided to the public switched telephone network (PSTN). Typically, a system manager 220 is also provided for overall system management and control together with one or more dispatcher consoles 222.

A power monitor unit (PMU) 224 is co-located with the primary site controller 250 and the base station transceivers that PMU 224 monitors. The primary function of the power monitor unit 224 is to measure the RF power developed by active transmitters at each base station transceiver 204-208, and if the power from any transmitter is below a predetermined threshold, this fact is reported to the site controller. Typically, the power monitor unit 224 includes a microprocessor, a display unit, and analog to digital conversion circuitry. To measure transmitted RF power, a probe is placed in the wire cabling connecting each base station transmitter to the transmit/combiner circuitry 202. RF power from the probe is detected using a conventional diode detector where the voltage developed by the diode is proportional to the RF power generated by the base station transmitter. The A-to-D conversion circuitry is connected to each diode detector and converts the analog voltage into digital form for processing by the microprocessor.

Each time the primary site controller 250 makes a channel assignment, the power monitor unit 224 receives a "channel mask" indicating which RF channels are active along with one or more commands to measure the RF power developed by each active base station transmitter. In response to these commands, the power monitor unit microprocessor senses the analog to digitally converted voltage from the diode detector representing the RF power developed by each transmitter. The digitized power measurements are compared against the predetermined thresholds, and any active channel having an output power below the threshold is indicated to the site controller 250. Such low power transmissions are ended, and the site controller turns off the transmitter of the base station corresponding to the low power channel.

The trunking card architecture and operation with the site controller, being relevant to the present invention, are described in conjunction with FIG. 3. Each trunking card (TC) includes a TC microprocessor 256 and associated random access memory (RAM) 258, a multiplexer 260, and a modem 262. TC microprocessor 256 executes software stored in random access memory 258 (which is preferably nonvolatile) in order to implement various control functions including "failsoft" modes of operation. TC microprocessor 256 transceives digital control signals to/from its associated base station transceiver via modem 262 and dedicated serial control line 264. For example, the TC microprocessor keys and unkeys the associated base station transmitter, controls the base station transmitter and receiver to process audio or digital signals, and disconnects power from the base station transceiver in order to conserve energy.

Each trunking card TC has three serial ports A, B, and C. Typically, multiplexer 260 selects only one of the received ports A, B, C to be monitored by the trunking card at any time with the select input of the multiplexer being controlled by microprocessor 256. Port A is connected to primary site controller 250 via dedicated parallel control bus 216(1). Port B is connected to an alternate site controller via similar control bus. However, in the present invention, port B is not used because a data switch 520 (described in detail in the detailed description) connected to port A is used to select which site controller to use. Port C is connected to the backup serial link (BSL) 228 which interconnects all of the trunking cards in daisy chain fashion. When the multiplexer 260 selects port A during normal operation, the trunking card processor 256 receives control messages from primary site controller 250 and also sends status messages to the primary site controller as well as to any alternate site controller via port B. In this way, the alternate site controller is constantly updated with status change information and can immediately take over control of the system if the primary site controller fails.

All or most control functions are performed by the primary site controller 250 which executes multitasking, event-driven software to provide advanced control functions such as call logging, dynamic regrouping, as well as simple control functions such as receiving channel requests, making trunking channel assignments, recording confirmed and dropped calls, handling priority calls and the like. For a more detailed description of these functions, reference is made to U.S. Pat. No. 4,905,302 entitled "Trunked Radio Repeater System" assigned to the assignee of the present invention the disclosure of which is incorporated herein by reference.

During normal system operation, the trunking card microprocessor 256 generally simply passes received digital control signals onto the primary site controller 250, passes digital control signals to be transmitted from the primary site controller 250 to its base station transceivers, and performs various other operations (e.g. initiate transmissions, unkey its associated base station transmitters, and the like) directly in response to control signals sent by the primary site controller 250. During normal operations, TC microprocessor 256 devotes most of its processing resources to processing signals received by its base station repeater receiver and signals to be transmitted by its base station repeater transmitter.

Also during normal system operation, the backup serial link 228 is not used. Independent operations of various trunking cards are coordinated by the primary site controller 250, and signal processing operations performed by the various trunking cards are loosely synchronized by synchronization signals produced by one of the trunking cards currently assigned as the control channel. These synchronization signals, e.g., regular sync pulses generated every 30 msec, are communicated to the rest of the trunking cards via frame sync control link (FSL) 226. Frame sync control link 226 is a single line that connects all of the trunking cards together in daisy chain fashion. This control line is used by whichever trunking card is assigned to the control channel to notify all other trunking cards of the beginning of each control channel slot on the outbound (i.e. from base station to the radios) control channel.

Accordingly, one of the trunking cards and its associated base station transceiver operate on the predetermined full duplex control communications channel. This control channel is monitored by radio units whenever they are not actually engaged in communications performed on working channels assigned to the other trunking cards. The control channel is time division multiplexed into a sequence of frames. Outbound control channel signals are continuously transmitted by the control channel base station transmitter. Radio units monitoring the control channel synchronize with the frame synchronization signals transmitted continuously on the outbound control channel which reduces the time required by the radio units to synchronously receive and transmit control channel signals.

The trunking card assigned to supervise control channel operations originates the control channel frame synchronization timing signals and places those signals on frame sync control link 226 as well as passes them to its associated control channel base station transmitter for transmission on the outbound control channel. Each of the trunking cards continuously monitors the frame sync control link 226, and the microprocessors of each trunking cards synchronize signal processing functions with the regularly transmitted pulses on the frame sync control link 226. In this way, when a radio unit receives a command transmitted on the outgoing control channel to change frequency to a working channel, the radio unit is already synchronized with the control channel timing.

To ensure a very high state of reliability, the trunked communications system 100 can be operated in a "failsoft" mode of operation. For a detailed description of such failsoft operation, reference is made to U.S. Pat. No. 5,175,866 entitled "Fail-Soft Architecture For Public Trunking System," assigned to the assignee of the present invention, the disclosure of which is incorporated explicitly here by reference. Briefly, when the trunking system 100 begins operating in the failsoft mode, multiplexers 260 of all trunking cards select port C and the backup serial link 228 becomes active. The trunking cards cease passing signals to and receiving signals from the primary site controller 250, and instead, trunking and other functions are performed in a distributed fashion by the trunking cards with signals being communicated between the trunking cards via the BSL 228. The control channel trunking card performs the supervisory role and uses various polling techniques to respond to working channel request messages and to assign working channels if available. Accordingly, reliable trunked communications are ensured even if the site controller is inoperable or if no site controller is used.

Thus, the trunked radio communication system described above provides a very reliable trunked radio communications system for a single site where all of the base stations, trunking cards, console, and the site controller are located at a single location. However, there are situations where it is desirable to "split" the site so that there are base station repeaters at two or more remote locations but nonetheless operate all of those base station repeaters at those locations as a single site system. For example, a single site system having fourteen channels (corresponding to fourteen base station transceivers) might be divided into two locations physically separated for example by hundreds or thousands of feet with each location being referred to as a split site location. At one split site location, eight base station repeaters would provide eight radio channels, and at the other split site location, six base station repeaters would provide six radio channels. Ideally, even though the base station equipment is physically divided into two split locations, the trunked communication system would still operate as a single fourteen channel single site system under the supervising control of one site controller located at either one of the site locations.

This split location, single site trunked radio architecture, to the knowledge of the inventors, is an entirely new concept. For example, base stations in existing single site systems can currently only be separated by no more than 50 feet and therefore do not offer split site location capabilities. Nor have problems such as maintaining data integrity and system synchronization for single site trunking system equipment physically separated by significant distances been either addressed or resolved. There is also the problem of how to control and manage split site locations and implement a failsoft mode of trunked radio communications. For example, how will information be transmitted between each of the base station transceivers (via their respective trunking cards) and a remote site controller over corresponding control data buses? Similarly, how will information be sent over the frame sync link and, in the failsoft mode of operation, over the backup serial link? There is also the problem of how to monitor RF power for the split location, single site system. For example, how does a single power monitoring unit at one of the site locations monitor and test the RF output power of all base station transmitter channels for both split site locations?

The present invention provides a split site trunked communications system to permit trunked RF communications between plural portable radios located at those split sites. A tint trunked RF communications site is located at a first site location and includes plural first base stations, each first base station including a transceiver corresponding to an RF communications channel. The first site also includes a first site controller for assigning base station transceivers to radios requesting an RF communications channel. A second trunked RF communications site is located at a second site remote from the first site and includes plural second base stations along with a second site controller. A communications link links the first and second trunked RF communication site so that they function as a single site trunked radio communications system with only one of the first and second site controllers assigning the first and second base station transceivers to radios requesting RF communications channels. The other of the first and second site controllers is a redundant, backup site controller that can assume operation of the first and second trunked RF communications sites as a single site system should the primary site controller for example be disabled. Thus, the single acting site controller controls base stations at both the local and remotely located sites using the communications link.

In one embodiment the communications link includes a fiber optical cable, with first and second fiber optic driver/receivers connected at respective ends of the fiber optic cable. First and second time division multiplexers, connected to the first and second fiber optic drivers, convert control and audio information from the first and second sites into a TDM serial data stream and transmitting the data stream over the fiber optic cable via the first and second fiber optic driver/receivers. The communications link may also include a separate control link that links particular control signals like synchronization signals to each of the first and second base stations.

The control link includes novel link extension circuitry that automatically senses which site is sending the control signals and reconfigures the control link to permit transmission by the transmitting site location on the communications link over considerable distance to the receiving site location. Such circuitry permits signal transmissions to be transmitted over the link from both sites without collision.

The architecture of the present invention is such that should both the first and second site controllers fail or otherwise be absent, the first and second remotely located base stations are operated as a single site in a failsoft mode of operation. In that instance, the base station operating as the control channel controls the RF trunking operations for all the base stations, both local and remote, utilizing the communications link.

This new architecture provides an unprecedented level of redundancy with only a marginal increase in actual equipment. The architecture of the present invention permits a split site location to be completely disabled through loss of power or intentional disruption with the remaining split site location(s) continuing to function with only a loss in system capacity. That loss is unnoticed by a system user because communications via the remaining split site locations continue without interruption. These features of course are highly desirable for strategic command centers or vital communication centers. The ability to operate with significant spacial separation between base stations using only one site controller provides excellent protection against both manmade and natural disasters that can disable a specific location which are of significant concerns to both public safety and emergency management systems. The architecture of the present invention also permits easy and inexpensive expansion of an existing trunked radio communication system without being constrained by the same physical location of the existing system. In other words, additional capacity could be provided within a new location in the same building or an entirely different location, e.g. an entirely different building.

In a single site, split location trunked radio communication system of the present invention, all assets are fully utilized during normal operation. This contrasts with traditional redundant main and backup systems where the backup assets are not utilized during normal operation. Thus, to provide fourteen channel capacity with full backup, for example, the traditional redundant system requires at least twenty-eight base stations. The present base invention provides a highly reliable fourteen channel system using only fourteen base stations.

In the split location-single site trunked radio communication system in accordance with the present invention, each split site location has a power monitoring unit which monitors the RF power of each active base station transmitter. A remote one of these power monitoring units, i.e., a power monitoring unit whose site controller is presently not in control of the system, transmits its monitored RF power information to the power monitoring unit whose site controller is presently in control of the system over the communications link connecting the split site locations. Thus, one of the power monitoring units essentially manages or supervises the collection of RF power data from all of the base station transmitters at the split site locations. However, if the first site controller becomes disabled (or is otherwise nonoperational), the site controller at another split site location takes over the task of monitoring the transmitted RF power from base stations located at all of the split site locations.

Each of the power monitoring units at each split site location includes a data processor, an analog to digital conversion unit, and RF power detector for generating an analog signal representing the RF power generated by a base station transmitter. The analog signal is converted into a digital signal by the analog to digital conversion unit. The data processor then compares the digital signal with a threshold value representing the desired minimum power level. If any of the base station transceivers is transmitting an RF power less than the minimum threshold value, that base station transmitter is deactivated.

These as well as other features and advantages of this invention will be more completely understood and appreciated by carefully studying the following detailed description of the presently preferred embodiments taken on conjunction with the accompanying drawings.

BRIEF DESCRIPTION OF THE DRAWINGS

FIG. 4 is a simplified block diagram of a single site, split location RF trunked communication system in accordance with the present invention;

DETAILED DESCRIPTION OF THE DRAWINGS

In the following description, for purposes of explanation and not limitation, specific details are set forth, such as particular circuits, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the invention with unnecessary details.

Figure 1:
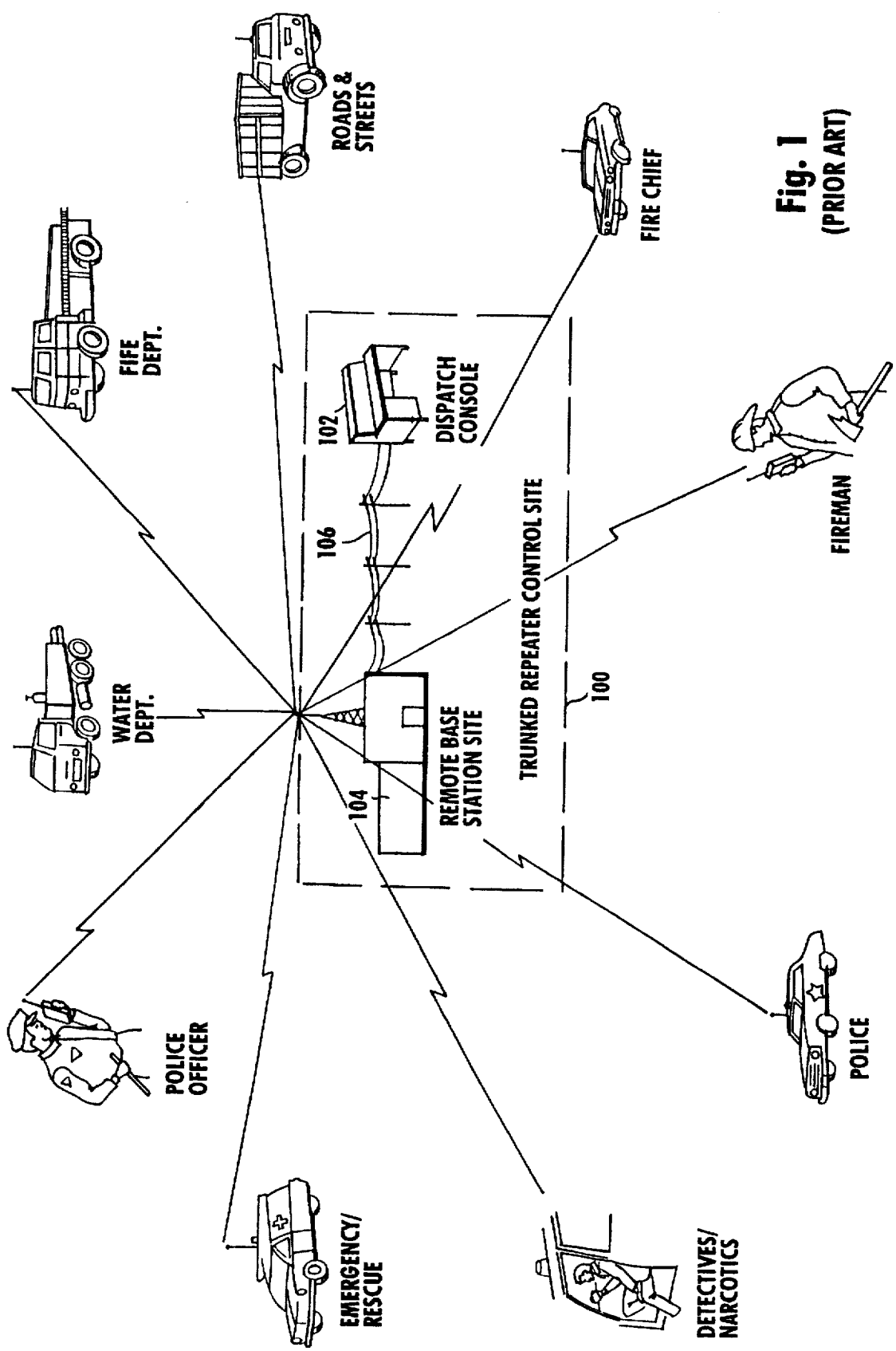
FIG. 1 is a general explanatory diagram of a trunked radio repeater system.
Figure 2:
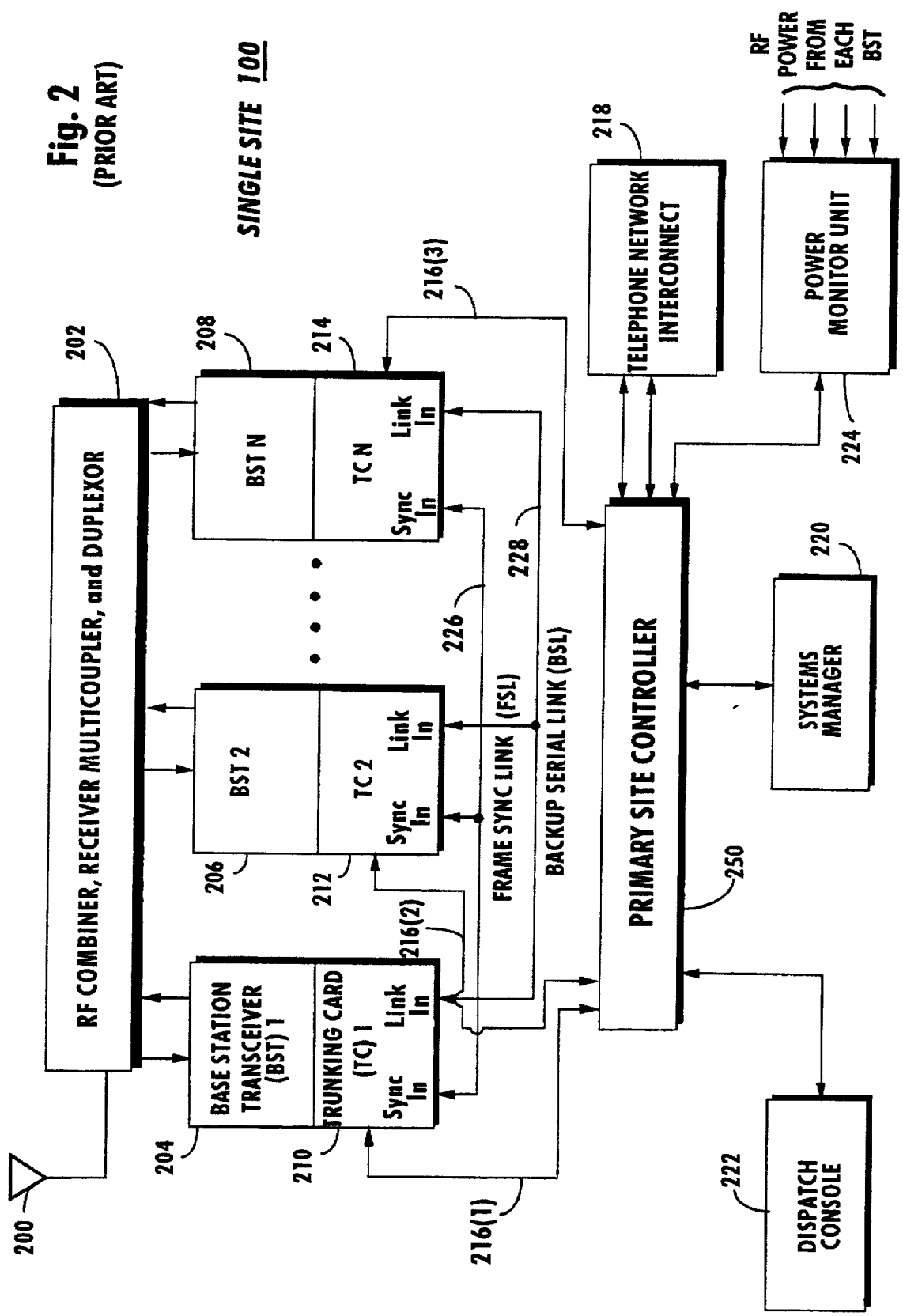
FIG. 2 is a simplified block diagram of a centrally located single site in the trunked repeater system of FIG. 1.
Figure 3:
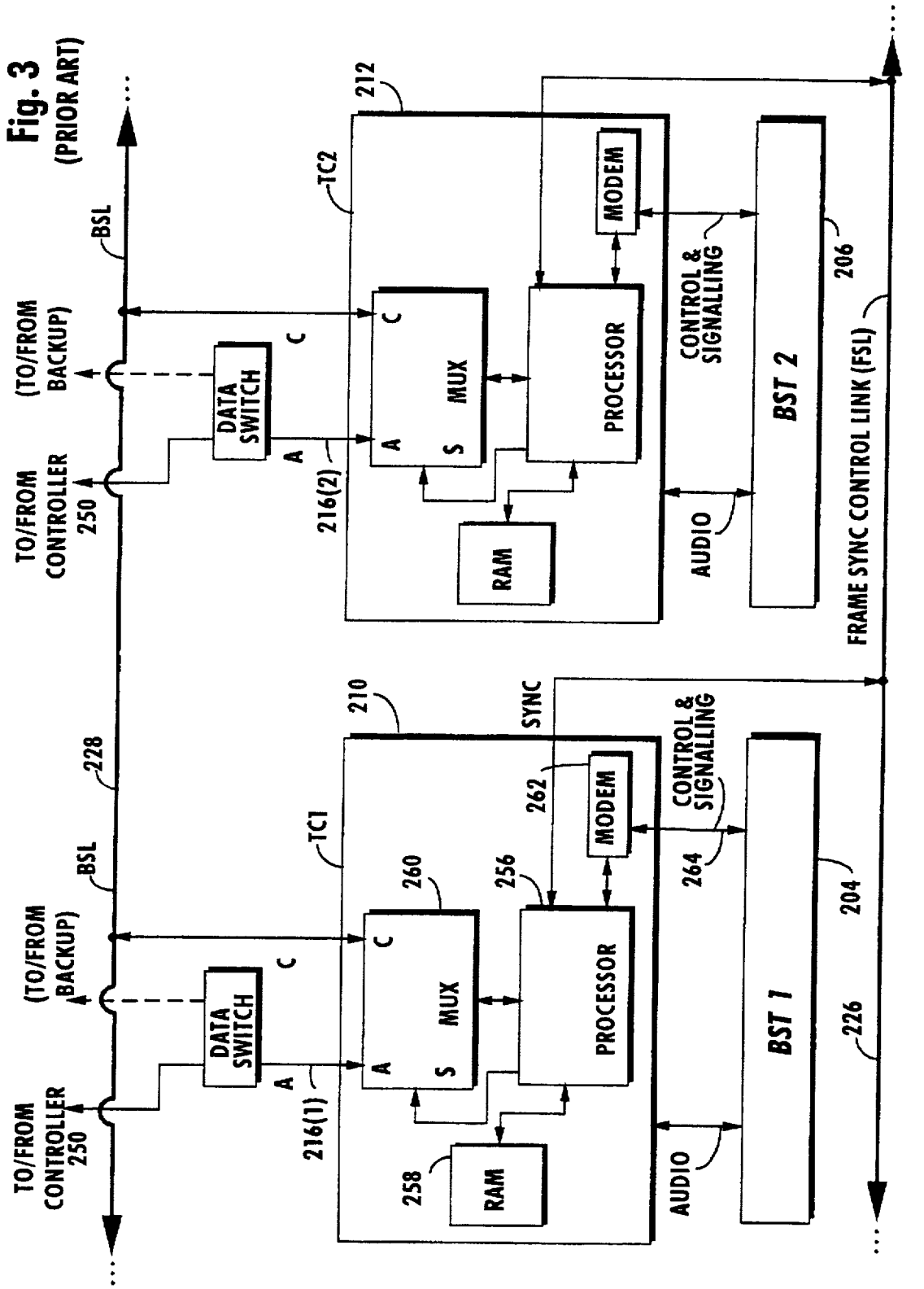
FIG. 3 is a simplified block diagram of channel trunking cards used to control the base stations of the central site architecture shown in FIG. 2.

FIG. 4 shows a block diagram of a single-site, split-location RF trunked communication system 500 in accordance with the present invention. The split site location (A) houses eight base stations each base station including a trunking card, transceiver, and the like similar to base stations and are configured as generally described above in conjunction with FIGS. 2 and 3 for a single site trunked radio repeater system and as described in further detail in U.S. Pat. Nos. 4,905,302 and 5,175,866 previously incorporated by reference. To simplify the description, however, that description is not repeated here. These eight base stations at split site location (A) correspond to radio frequency channels (1-8). Split site location (B) houses six base stations (B) corresponding to RF channels (9-14). Obviously, any number of base stations could be located at each split site location to achieve any desired total number of RF channels. In addition, although two split site locations (A) and (B) are shown, more than two such locations could also be coordinated and operated in accordance with the present invention as a single site. To further simplify the description, only the function blocks in split site location (A) are described with the understanding that similar hardware is located used at split site location (B).

Dispatch console 519 is connected to an audio bridge 518 and to a time division multiplex (TDM) multiplexer 524. The audio bridge 518 is essentially a large resistive network that takes audio signals (analog or digital) to/from the console 519, impedance matches those signals and provides them to/from local base stations (A) as well as to the remote base stations 502 (B) and to the remote console (B) through the multiplexer 524. In this way, the dispatch console at the local split site location may participate in audio communications on any of radio channels (1-14).

The TDM multiplexer 524 may be a T1 multiplexer, (T1 corresponding to 24 time division multiplexed, time slot type channels), which is conventional off-the-shelf equipment and in this example may be Model No. TDM-163 manufactured by Intraplex Inc. Of course, a larger TDM multiplexer or plural TDM multiplexers could be used to service a larger number of radio channels and/or control signals. The T1 multiplexer 524 takes multiple, full duplex digital and/or analog data streams including audio information and control information and, using time domain multiplexing, converts those streams into consecutive time slots in one high speed data stream as is well known in the art.

The T1 multiplexer 524 connects with a commercially available fiber optic driver/receiver 526, e.g., the T1 single fiber loop converter model number F1544-10 DS1 SFLC available from ADC Telecommunications Inc. Fiber optic driver/receiver 526 includes among other things an LED light source and a photodiode detector. To transmit, the fiber optic driver/receiver 526 converts the electrical, high speed data stream from the T1 multiplexer into corresponding light energy suitable for transmission over fiber optic links. The driver is full duplex and therefore can transmit and receive at the same time. The photodiode detects light energy received over the fiber optic link and converts that received light into corresponding electrical signals. If desired, redundant fiber optic links could be used with an optical switch at each split site location to route the information to/from the appropriate fiber link.

A data switch 520 connected by twisted pair lines between each of the local base stations 502, the T1 multiplexer 524 and the site controller 504, is essentially a large switch that permits data and control information over each of the lines to/from the base stations 502 to be passed to/from either the local site controller 504 or the T1 multiplexer 524. Referring back briefly to FIG. 3, control information from each base station thinking card is connected to the data switch 520 over bus lines 216. Thus, the data switch accommodates each of the base station channels 1-14 and provides additional lines or "channels" dedicated to control signals. In essence, the data switch is a multiple pole, double throw switch that is controlled by control switch 522. Such a data switch may be for example the SM-500 series ganged switch sold by Black Box Corporation.

In addition to being connected to the data switch 520, control switch 522 is connected to a local power monitor unit 530. Control switch 522 may be a simple, manually-operated switch that generates a signal that either selects the site controller A at site location A or the site controller B at site location B to function as the single site controller for both split sites. If the local site controller is selected, the control switch 522 is set to send a signal to the data switch at both split site locations to have each TC microprocessor select its A port (see again FIG. 3). The data switches 520, being set in accordance with the control switch signal, direct signals between the site controller and its local base stations via relatively short wire connection and between the site controller and remote base stations via relatively long fiber optic link 528. Of course, the function of control switch 522 could be automatically performed, e.g., by setting a select flag or bit.

Therefore, the control switch 522 and data switch 520 determine which site controller is to operate the base stations at the split site locations as a single site. The data switch 520 is set by the control switch 522 to route signals from local base stations either over the fiber optic link 528 to the remote site controller or directly to the local site controller.

Figure 5:
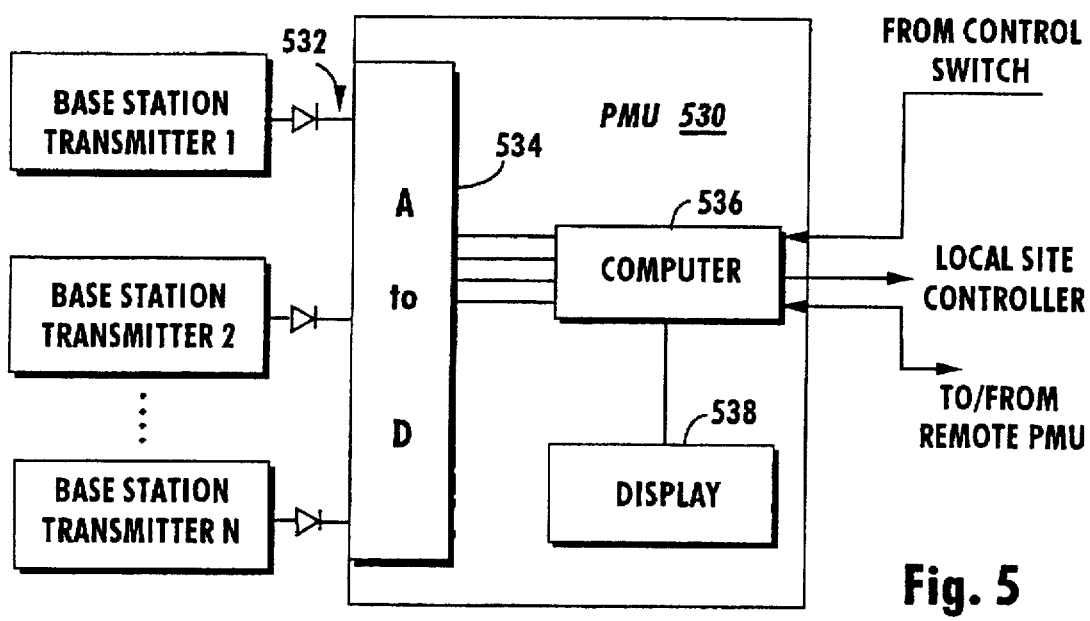
FIG. 5 is a simplified block diagram of a power monitoring unit used in conjunction with the present invention.

Referring to FIG. 5, power monitor unit (PMU) 530 includes a computer 536 which may include an Intel 80486 microprocessor with suitable disk memory and analog-to-digital (A to D) conversion circuitry 534 and a display 538 connected to the computer 536. Conventional diode detection circuitry referred to generally at 532 detects RF power transmitted from each active local base station transmitter.

An analog signal proportional to RF power is converted into a digital value by A to D conversion circuitry 534. The computer 536 compares the received digital values to a minimum threshold.

The computer 536 detects from a signal generated by the control switch 522 which site controller is operating the split site system. For any local base station transmitters transmitting at powers below the threshold, the computer 536 sends an alerting signal to the local site controller if it is in charge. However, if the remote site controller is in charge, the computer 536 transmits these alerting signals to remote site location PMU via the T1 multiplexers and communications link. Thus, the PMU at the split site location where the site controller currently in charge receives and stores all power monitoring information for all active base station transmitters in the system and sends low power alert messages to that site controller to permit the site controller to take any necessary action such as dropping the channel.

As described above in conjunction with FIGS. 2 and 3, the trunking card of each base station is connected to frame sync link (FSL) 510 an(FSL) 510 and backup serial link (BSL) 512. In the embodiment of the present invention being described in conjunction with FIG.4, each of these links is also connected to a link extender circuit 508 which transceives serial data from the frame sync link (FSL) 510 and backup serial link (BSL) 512 over twisted pair communication links 514 and 516 dedicated to the FSL and BSL, respectively, and connected to the remote split site location (B). Using twisted wires, the link extenders (A) and (B) at split site locations (A) and (B) may be separated by up to ten thousand feet and this limitation being primarily due to the bandwidth restrictions of a twisted wire pair communications path. Other communications media which have greater distance capabilities could also be used assuming bandwidth and data reliability requirements are met. For example, the FSL and BSL data could be routed through the T1 multiplexers over the same fiber optic link 528 or separate fiber optic link. Fiber links do not have the limitations of twisted pair wires and therefore the link extenders could be separated by much greater distances. As will be described in further detail below in conjunction with FIG. 7, a significant feature of the link extension circuitry is that it automatically senses which split site location is currently transmitting control channel data and automatically configures itself to permit that transmission and block transmissions from the remote split site location.

Figure 6:
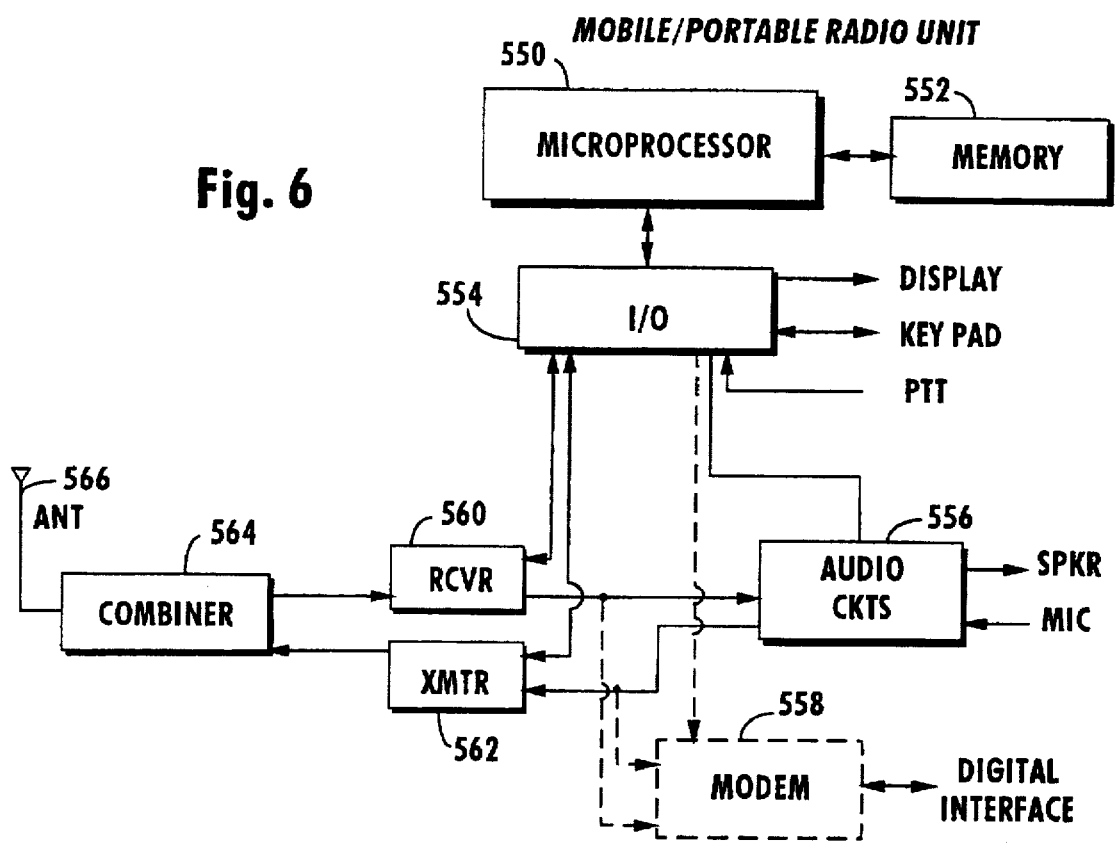
FIG. 6 is a simplified block diagram of a mobile/portable radio unit that may be utilized for communication within the single-site split-location trunked repeater system in FIG. 4.

The general architecture of a suitable mobile/portable radio unit for use with the present invention may be microprocessor based as depicted in FIG. 6. Here microprocessor 550 is provided with suitable memory 552 and input/output circuits 554 so as to interface with the radio unit display, keypad, push-to-talk (PTT) switch as well as audio circuits 556 which provide basic analog audio outputs to the speaker and accept analog audio inputs from the microphone. Auxiliary control over a modem 558 as a digital interface to voice encryption, vehicle location, or other types of digital communications subsystems may also be provided if desired. Of course, the I/O circuits 554 also permit suitable programmed control over RF receiver 560 and transmitter 562 which via conventional signal combiners 564, provide two way fully duplexed communication over a common antenna 566 as will be appreciated by those skilled in the art.

Figure 7:
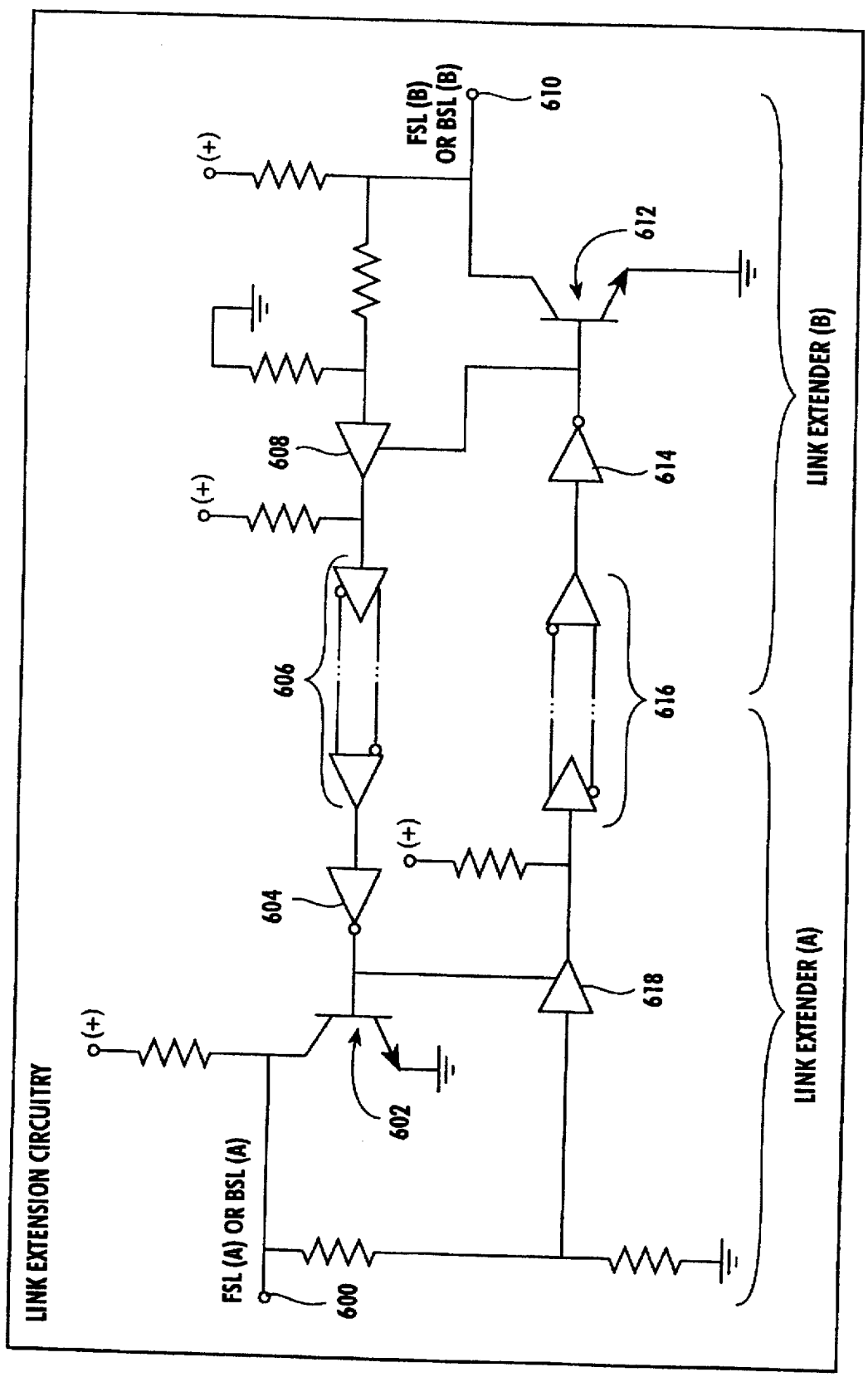
FIG. 7 is a more detailed schematic drawing of the link extender used in conjunction with the present invention.

A more detailed description of the link extension circuitry 508 is now provided in conjunction with FIG. 7. Although only one link extension circuit is shown, both the FSL and BSL links include their own link extension circuitry. The link extender (A) at split site location (A) includes a transmit/receive port (A) 600 connected to the frame sync link (A) or the backup serial link (A). Port 600 is connected directly to the collector of transistor 602 and via a voltage divider to the input of a tristate buffer 618. The collector of transistor 602 is also connected via resistor to a positive power supply. The base of transistor 602 is connected to an enable port of the tristate buffer 618. When enabled, the tristate buffer 618 passes transmit data at port 600 to a differential driver and receiver amplifier pair 616 connected together by a shielded, twisted pair of communication lines. The differential data at the differential receiver amplifier is inverted in an inverter 614, the output of which is connected to the base of transistor 612. The collector of transistor 612 (connected to a power supply) provide an output signal at transmit/receive port (B) 610.

The transmission path from port (B) 610 to port (A) 600 is similar in that FSL(B) or BSL(B) signals to be transmitted from port (B) 610 are passed through a voltage divider to tristate buffer 608. The base of transistor 612 is also connected to an enable port of tristate buffer 608. When tristate buffer 608 is enabled, the serial information at port (B) is transmitted via differential driver/receiver amplifier pair 606 and communication lines, inverted at 604, and amplified at transistor 602 which provides the received output at port (A) 600.

The operation of the link extension circuitry will now be described using the example of transmitting a frame sync pulse FSL(A) present at port (A) 600 over the communications link. In this example, the differential link 616 is the active transmissions path and differential link 606 is the inactive transmission path. When the frame sync pulse occurs with a high to low voltage level transition, it is passed through normally enabled tristate buffer 618, sent along differential link 616, and inverted to a high logic level at the output terminal of inverter 614. This high output level of inverter 614 disables the tristate buffer 608 which prevents any signals from being transmitted on the other differential link 606 going in the opposite direction. In this way, data collisions are automatically prevented at transmit/receive ports 600 and 610, i.e., a port receiving cannot simultaneously transmit. Transistors 612 and 602 are simply voltage level converters which take the logic high output from their respective inverters at a first voltage level, e.g. five volts, and raise it to the voltage level of the collector power supply, e.g. twelve volts, for use by the trunking cards of the remote base stations.

For a similar frame sync pulse transmitted at port 610, on the differential link 606 in the opposite direction (split site B to A), buffer 618 is disabled by a high logic level at inverter 604 and therefore blocks transmission of any input data at port 600. Thus, the link extension circuitry in accordance with the present invention automatically configures itself either to transmit or receive and automatically ensures that there are no data collisions in an attempt to simultaneously transmit and receive from at either terminal in split site locations A and B.

The overall operation of the single site split location trunked communication system will now be described. The control switches in both split site locations A and B are set to select which site controller is in charge. Assume for the sake of explanation that site controller A is in charge of the split site system. The base stations (A) corresponding to radio channels 1–8 are therefore controlled in the same fashion as described above and in more detail in U.S. Pat. No. 4,905,302. The dispatch console at site location (A) participates in radio communications on channels 1–8 in the same fashion as in a conventional single site trunk repeater system except that these local communications are routed through audio bridge (A). Moreover, monitored RF power from local base station transmitters 1-8 is accomplished by the power monitor unit (A) with corresponding power signals being sent directly from the power monitor unit (A) to the site controller (A).

Dispatch console (A) can also participate in communications on remote channels 9-14 located at split site location (B). Audio signals are routed from base station channels 9-14 through the audio bridge (B) to the T1 multiplexer (B) and transmitted in time division multiplex format over the fiber optic link to the T1 multiplexer (A) via fiber optic driver/receivers (A) and (B). The T1 multiplexer (A) routes the audio through the audio bridge (A) to dispatch console (A). Communications from dispatch console (A) are routed in the opposite path for transmission over channels 9-14.

Control signals between site controller (A) and remote base stations (B) will now be described. Control channel information such as working channel requests from a base station to the site controller (A), working channel assignments from the site controller (A) to the control channel base station and an available working channel base station, working channel confirmation and drop messages from the working channel base station to the site controller A are handled in two different scenarios. Assume for the first scenario that one of the base stations (A) is designated as the control channel base station. Control messages such as those described above are sent from the site controller over line 506 through the data switch 520 to the control channel base station. That information is transmitted over the RF control channel via T1 multiplexer (A), fiber optic communications link 528, T1 multiplexer (B), and data switch (B) to base stations 9-14 at split site location (B). Working channel assignments are communicated directly to remote base station 9-14 from site controller (A) following a similar path. Status signals from the remote base stations (B) are routed to the site controller (A) through data switch (B), T1 multiplexer (B), communications link 528, T1 multiplexer (A), and hardwire link 505.

As described above, power monitor unit (A) also receives detected RF power signals from power monitor unit (B) through the fiber optic link and multiplexing circuitry and routes the necessary power monitor information for base stations and split site locations (A) and (B) to site controller (A). If there becomes a need to operate the single site split location trunked radio communication system using site controller B, the control switches at each split site location would be switched accordingly so that the appropriate signal muting occurs.

As described above, each of the base station trunking cards in the local and remote split site location are kept in loose synchronization via frame sync pulses sent out regularly by the control channel base station over the frame sync link (FSL) through the link extenders A and B over the frame sync link bus 514.

A significant advantage of the present invention is that the single site split location trunked radio communication system can operate as a single site in failsoft mode to continue trunking operations without a site controller in accordance with the procedures outlined in U.S. Pat. No. 5,175,866. Once the split location, single site trunking system enters a failsoft mode, the multiplexers in all of the trunking cards in the base stations (A) and (B) automatically select port C, and the backup serial link (BSL) 512 is activated. Trunking and other functions are then performed in a distributed fashion by the trunking cards with signals being communicated between the trunking cards via the BSL communications links and link extenders A and B. The control channel base station trunking card at one of the split site locations performs the supervisory role using various technique polling techniques to respond to working channel request messages and to assign base station working channels if available. Accordingly, reliable single site split location trunked radio communications are ensured even if site controllers A and B are inoperable (or if the system is intentionally operated without a site controller).

Thus, the present invention provides a single site, split location trunked radio communication system that operates in a fashion which makes "transparent" the split nature of the system. Even though some of base stations are spaced a remote distance from the site controller, all of the base stations at both split sites can be accessed and assigned just as in the single site scenario. This architecture is transparent because the single site split location system can be achieved without changing the hardware of existing base station transceivers, thinking cards, control and data buses, site controllers, or the radio units. Moreover, the various control and working channel protocols which have been established for a single site can be used without modification.

The power monitoring operation for monitoring base station transmitter power in the split location, single site trunked radio communication system in accordance with the present invention will now be described in conjunction with the flow chart diagrams illustrated in FIGS. 8-12. The flow chart diagrams describe procedures followed by each power monitoring unit in both split site locations.

Figure 8A:
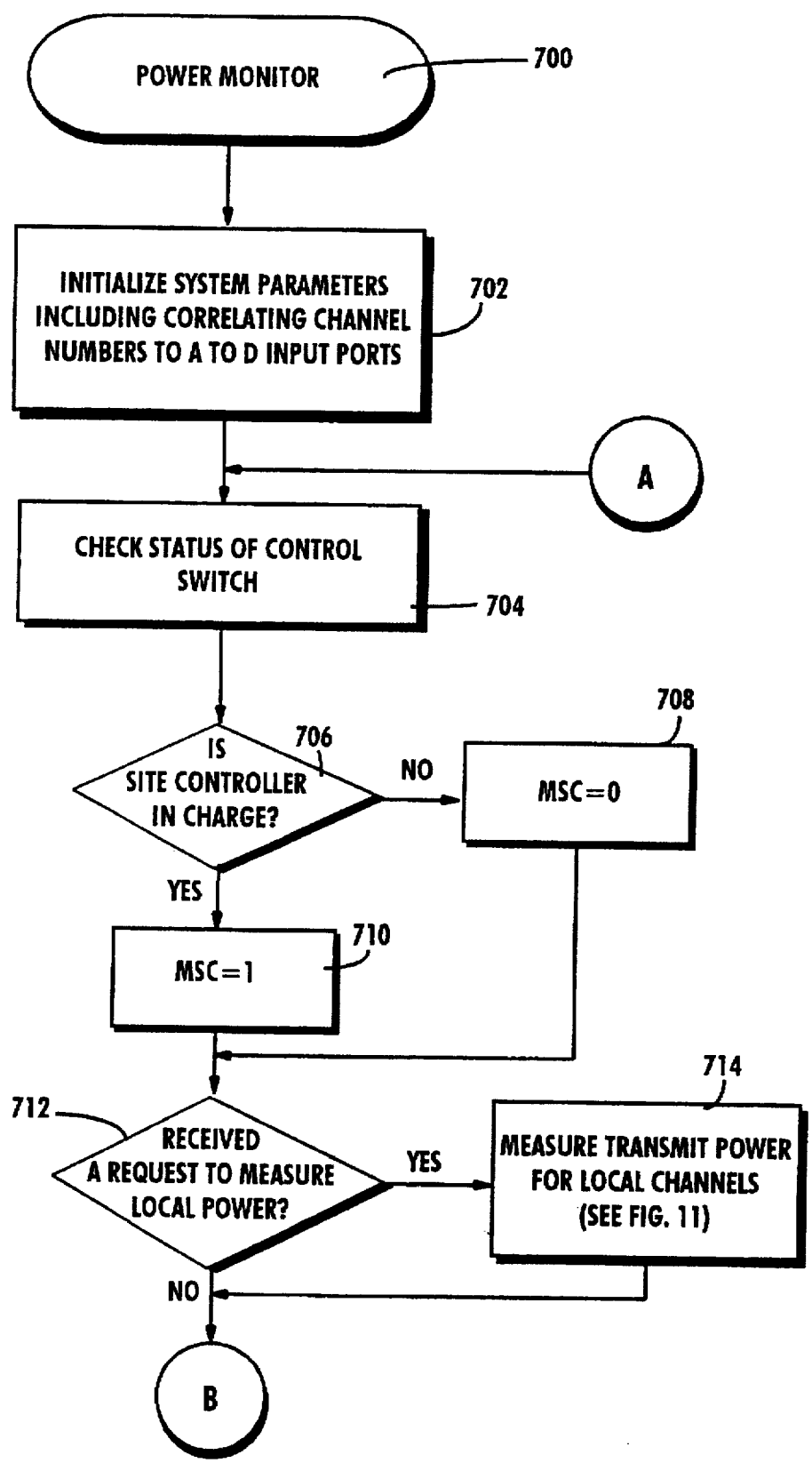
FIGS. 8-12 are flow chart diagrams relating to split location single site power monitoring operations in accordance with the present invention.

The main power monitoring routine 700 will first be described in conjunction with FIGS. 8(A) and 8(B). System parameters are initialized in block 702 including correlating base station channel numbers to the analog to digital input ports of A to D converter 534 in each power monitoring unit (PMU). In step 704, the power monitoring unit checks the status of the signal from control switch 522 and determines whether its local site controller is in charge of the entire split location, single site system (decision block 706). If not, the PMU sets a master site controller (MSC) flag to zero in block 708 meaning that it is the remote PMU. If the local site controller is in charge, the PMU sets its MSC flag to one in step 710. In decision block 712, a determination is made whether the power monitoring unit has received a request to measure the power of the currently active local base stations. If so, the power monitoring unit measures the transmit power for all local channels in block 714 in accordance with the operations outlined in FIG. 11 described below. Control proceeds to decision block 716 where the power monitoring unit determines whether or not it has received a request to measure remote power. If it has, the transmit power for remote base station transmitters currently transmitting is measured in block 718 in accordance with the procedures outlined in FIG. 12 described below. The power monitoring unit then determines whether or not a message has been received from the other power monitoring unit in decision block 720. If so, the power monitoring unit reads the message received from the other PMU in block 722 in accordance with the procedures outlined in FIG. 10 described below. Similarly, the power monitoring unit determines whether or not a message has been received from the site controller in decision block 724. If it has, the message is read in block 726 in accordance with the procedures outlined in FIG. 9 described below. At this completion of the power monitoring routine, control proceeds back via flag A to the beginning of the power monitor routine.

Figure 8B:
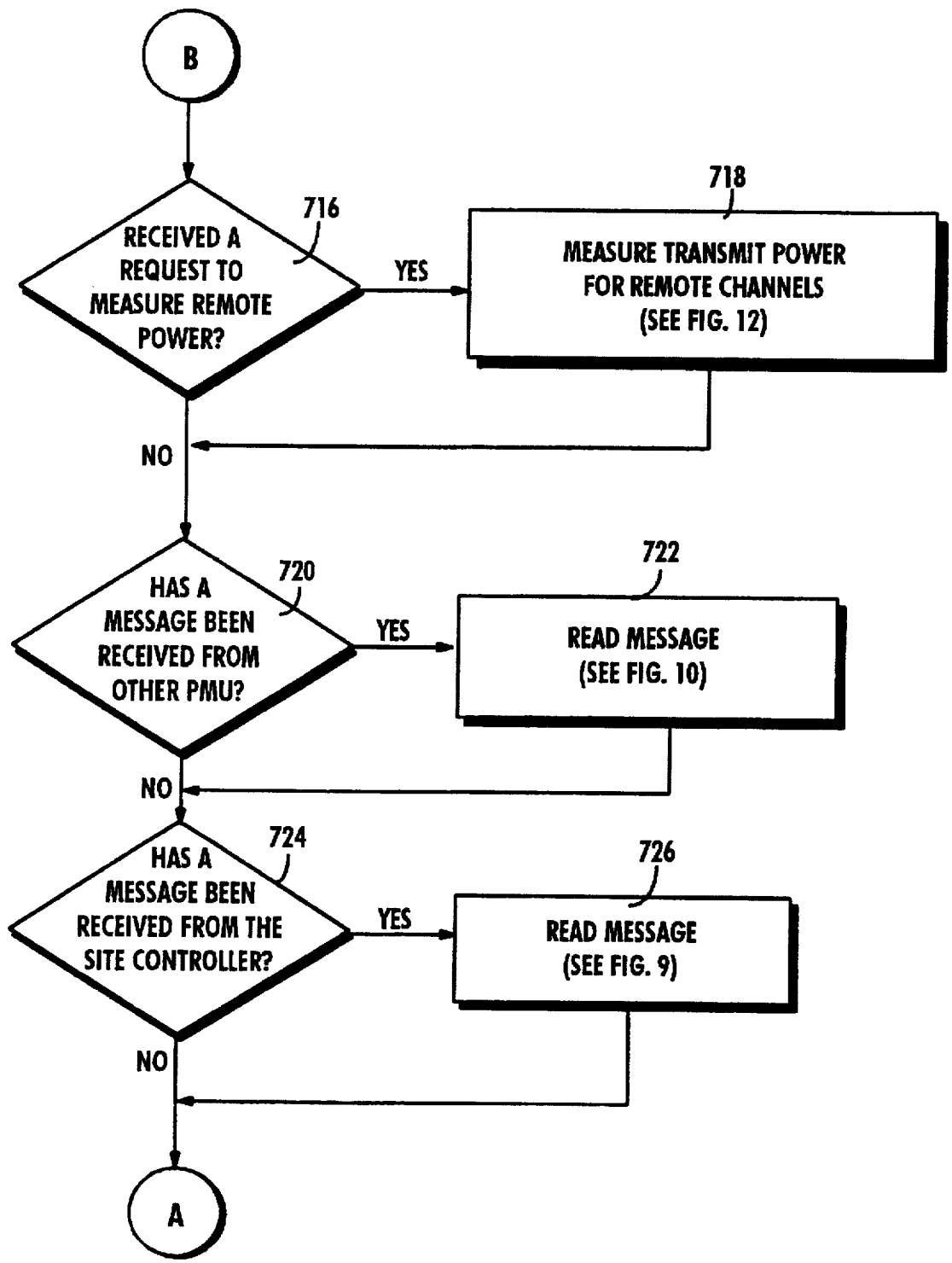
Figure 9:
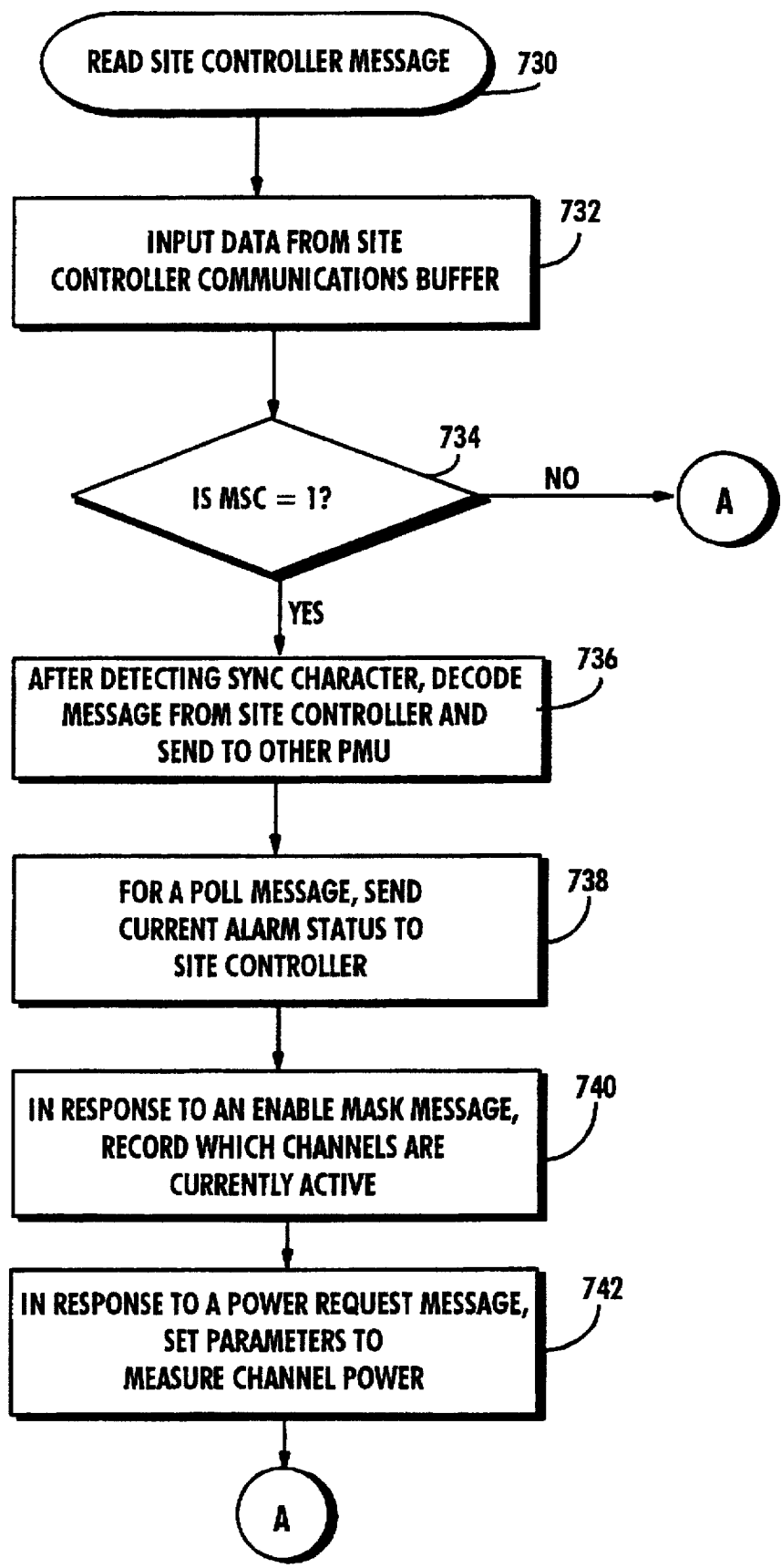

The procedures for reading site controller messages referenced in block 726 in FIG. 8(B) are now described in conjunction with FIG. 9. The PMU inputs data from its site communications buffer in block 732 and determines whether or not its site controller has been set as the master site controller by checking its MSC flag in block 734. If the MSC flag equals zero, control return to the main power monitoring loop via flag A. If the MSC flag is set to one, the power monitoring unit analyzes the input data to detect a synchronization character, decodes the message from the site controller, and forwards that message to the other PMU via the T1 multiplexers and fiber optic communication link in step 736. A number of different messages may be received from the site controller. For example, in block 738 if a poll message is received and decoded, the PMU sends a current alarm status report to the site controller. This alarm report informs the site controller of any base station transmitters (at local and remote locations) which may be transmitting below a threshold power. In response to an enable mask message from the site controller, the PMU records which channels have been enabled by the site controller as active channels. In response to a power request message in block 742, the PMU sets appropriate parameters to measure channel power at each base station transmitter. Thereafter, control returns to the main loop via flag A.

Figure 10:
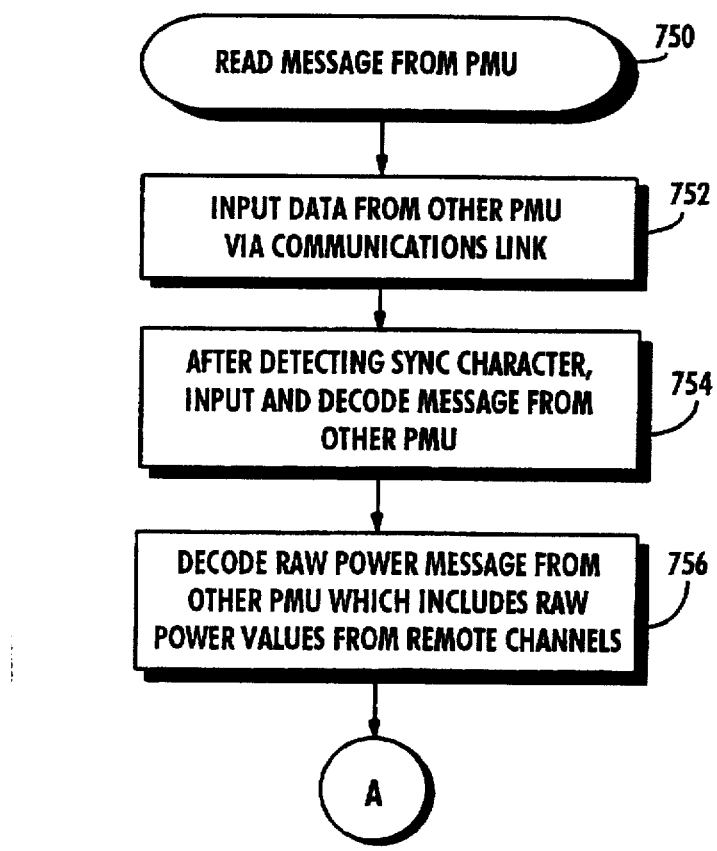

A routine 750 for reading messages from the other PMU (i.e., the remote PMU at the other split site location) referred to in step 722 in FIG. 8(B) will now be described in conjunction with the flow chart in FIG. 10. In block 752, the PMU inputs data received via the communications link 528 and T1 multiplexer 524. After detecting a sync character associated with the received message, the PMU inputs and decodes the message from the remote PMU in block 754. For example, in step 756, the PMU typically decodes a raw power message from the remote PMU which includes raw power values from the remote base station transmitters corresponding to remote channels. Thereafter, control returns to the main loop.

Figure 11:
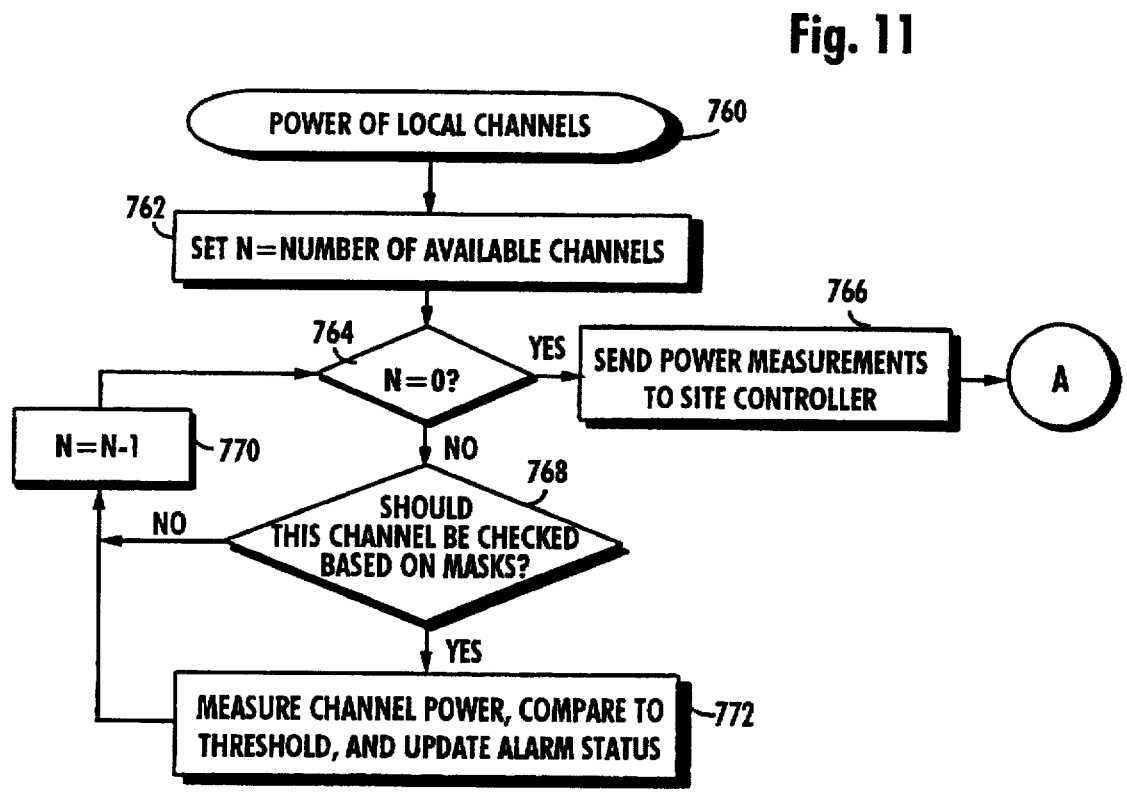

A routine 760 for actually measuring the power of local base station channels referred to in block 714 of FIG. 8(A) will now be described in conjunction with the flow chart diagram illustrated in FIG. 11. In block 762, a variable "n" is set equal to the number of available channels. In decision block 764, it is determined whether or not variable "n" equals zero. If so, all of the power measurements for active channels have been measured and those power measurements are sent on to the site controller in block 766 with control thereafter returning to the main power monitor routine via flag A. Otherwise, a decision is made whether the current channel number should be checked based for example on whether it is an enabled channel (as defined for example by the enable mask received from the site controller) and on a power mask identifying those particular channels for which the site controller requests a power measurement. If this particular channel should not be checked, the variable n is decremented in block 770 and control returns to decision block 764. Otherwise, that particular channel's transmit power is measured, compared to a minimum power threshold, and used to update an alarm status message report ultimately sent back to the site controller in block 772.

Figure 12:
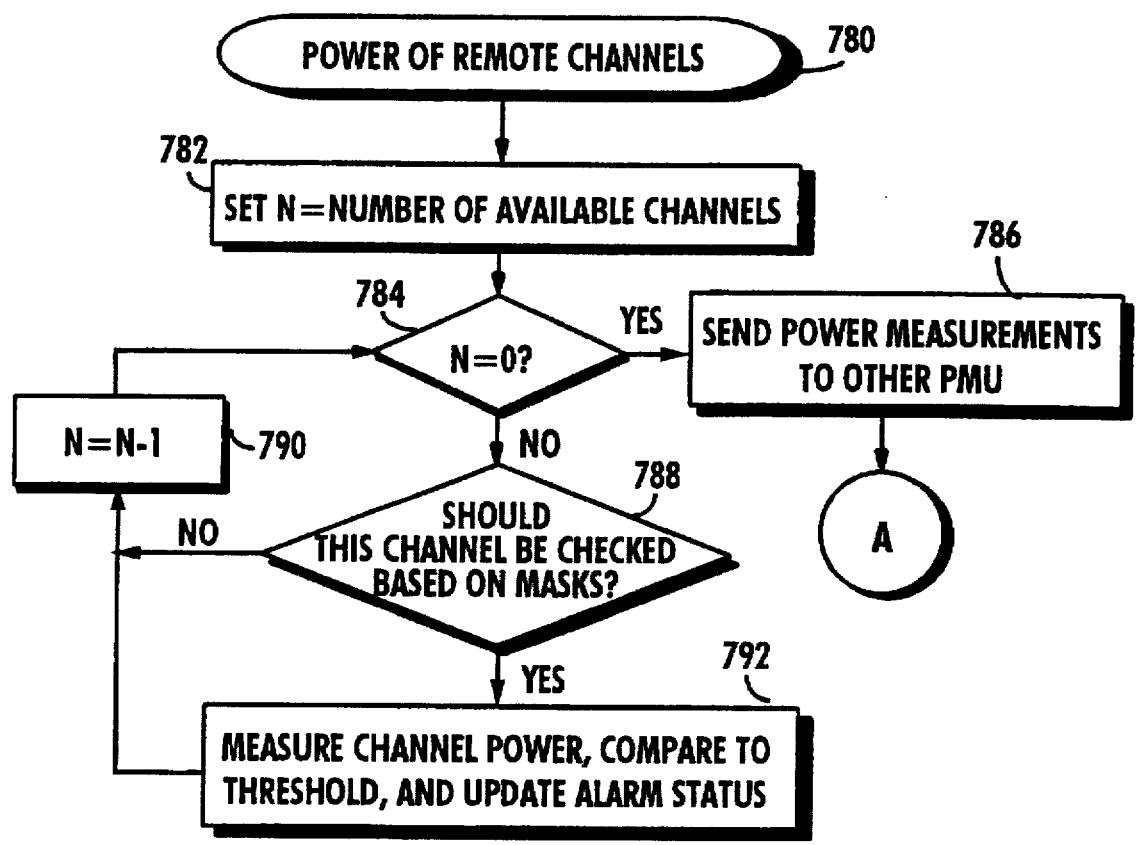

A routine 780 for measuring the power of remote base station channels as indicated in block 718 of FIG. 8(B) is now described in conjunction with the flow chart illustrated at FIG. 12. In block 782, a variable "n" is set to the number of available channels. In decision block 784, it is determined whether variable n equals zero. If so, all of the remote channel power measurements have been taken, and those power measurements are sent to the other PMU via the communications link 528 and multiplexers 524 with control returning thereafter via flag A to the main power monitor routine 700. If n does not equal zero, a decision is made in block 788 whether this channel should even be checked based on, for example, enable and power monitoring masks sent from the site controller via the other PMU. If not, the variable n is decremented in block 790 and control returns to block 784. The base station transmitter power corresponding to that channel is measured, compared to a minimum threshold, and the alarm status for that channel updated in block 792.

Thus, the power monitoring routine in accordance with the present invention provides a mechanism by which a single site controller located at one site location can monitor RF transmitter power of base stations at that location as well as monitor RF power transmitted by base stations located at a remote split site location. In particular, the power monitoring unit whose local site controller is the master site controller currently in charge of the split location, single site trunked communication system performs power monitoring tasks associated with its own base station transmitters as well as coordinates power monitoring messages to and raw power values from the remote power monitoring unit over the fiber optic communications link 528 via T1 multiplexers 524.

In summary, even if a split site location is completely disabled through loss of power or intentional disruption, the remaining split site location(s) continues to function with only a loss in system capacity. The ability to operate spacially separated base stations using only one site controller (or no site controller in failsoft mode) provides excellent protection against both manmade and natural disasters that can disable a specific split site location. Even if the local site completely failed and was nonoperational, the remote split site would continue to function to maintain trunked communications. The architecture of the present invention also permits easy and inexpensive expansion of an existing trunked radio communication system. Moreover, in the single site, split location trunked radio communication system of the present invention, all assets are fully utilized during normal operation in contrast to traditional main and backup systems which include fully redundant assets where the backup assets are not utilized during normal operation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A single site, split location trunked radio communications system, comprising:

plural portable radios;

a first trunked RF communications site located in a first split site location including plural first base station transceivers, each first base station transceiver corresponding to an RF communications channel, a first site controller assigning base station transceivers to radios requesting an RF communications channel, and a first power monitoring unit for monitoring the RF power transmitted by actively transmitting first base station transceivers;

a second trunked RF communications site located in a second split site location physically remote from the first split site location including plural second base station transceivers, each second base station transceiver corresponding to an RF communications channel, a second site controller for assigning base station transceivers to radios requesting an RF communications channel, and a second power monitoring unit for monitoring the RF power transmitted by actively transmitting second base station transceivers; and a communications link linking the first and second trunked RF communications sites, wherein the first and second trunked RF communications sites function as a single site with one of the first and second site controllers assigning both first and second base station transceivers to radios requesting an RF communications channel, and wherein one of the first and second power monitoring units transmits monitored RF power information to the other of the first and second power monitoring units over the communications link.

2. The system in claim 1, further comprising:

wherein one of the site controller receives monitored RF power information for all of the first and second base station transceivers from the one of the first and second power monitoring units.

3. A single site, split location trunked radio communications system, comprising:

plural portable radios;

a first trunked RF communications site located in a first site location including plural first base station transceivers, each first base station transceiver corresponding to an RF communications channel, a first site controller assigning base station transceivers to radios requesting an RF communications channel, and a first power monitoring unit for monitoring the RF power transmitted by actively transmitting first base station transceivers;

a second trunked RF communications site located in a second site location physically remote from the first site location including plural second base station transceivers, each second base station transceiver corresponding to an RF communications channel, a second site controller assigning base station transceivers to radios requesting an RF communications channel, and a second power monitoring unit for monitoring the RF power transmitted by actively transmitting second base station transceivers;

wherein the first and second trunked RF split communications sites function as a single site with one of the first and second site controllers assigning both first and base station transceivers to radios requesting an RF communications channel, and wherein one of the first and second power monitoring units manages monitored RF power data from both the first and second site locations.

4. The system in claim 3, further comprising:

a communications link linking the first and second trunked RF communications sites, the first and second power monitoring units communicating monitored RF power data over the communications link.

5. The system in claim 4, wherein the first site controls the operation of the first and second base stations so that they operate as a single site and the first power monitoring unit receives monitored RF power data from the second power monitoring unit over the communications link.

6. The system in claim 3 wherein the first and second power monitoring units include:

a data processor;

an analog to digital conversion unit;

an rf power detector generating an analog signal representing the RF power generated by a base station transmitter, wherein the analog signal is converted into a digital signal by the analog to digital conversion unit and the data processor compares the digital signal with a threshold representing a desired power level.

7. In a radio communications system having plural portable radios, a first controller located at a first location along with plural first base station transceivers and a first power monitor for monitoring transmitted RF power from the first base station transmitters and a second location remote from the first location having plural second base station transceivers and a second monitor for monitoring transmitted RF power from the second base station transceivers, a method comprising:

operating the first and second base station transceivers at the first and second locations using only the first controller;

communicating transmitted RF power values from the second power monitor to the first power monitor; and monitoring at the first controller located at the first location transmitted RF power from the first base station transmitters and the second base station transmitters using RF power values provided by the first power monitor.

8. The method in claim 7, wherein the first and second power monitors are connected by a fiber optic link.

9. The method in claim 7, wherein the second location includes a second controller for monitoring transmitted RF power from base station transmitters located at the first location and transmitted RF power from base station transmitters located at the second location when the first controller at the first location is absent or not enabled.

10. The method in claim 9, further comprising:

determining at both of the first and second power monitors which of the first and second controllers is operational.

11. In a split location, single site RF trunked communications system including first and second split site locations each having plural base station transceivers connected to first and second site controllers located at the first and second locations, respectively, a method comprising the steps of:

detecting at each location, which of the first and second site controllers is controlling operation of the split location, single site RF trunked communications system, and monitoring the transmitted RF power of base station transceivers at both the first and second split site locations using only one of the first and second site controllers.

12. The method in claim 11, further comprising:

if the one site controller becomes unavailable or disabled, monitoring the transmitted RF power of base station transceivers at both the first and second split site locations using the other of the first and second site controllers.

13. The method in claim 11, further comprising: comparing the transmitted RF power of base station transceivers at both the first and second split site locations to a minimum threshold value, and deactivating any of the base station transceivers at both the first and second split site locations whose transmitted RF power is less than the minimum threshold value.

* * * * *